United States Patent
Kervec et al.

(10) Patent No.: US 8,532,189 B2
(45) Date of Patent: Sep. 10, 2013

(54) METHOD FOR DETECTING SCENE CHANGE IN A VIDEO PICTURE SEQUENCE

(75) Inventors: Jonathan Kervec, Paimpont (FR);
Didier Doyen, La Bouexiere (FR);
Emmanuel Jolly, Rennes (FR)

(73) Assignee: Thomson Licensing, Issy-les-Moulineaux (FR)

( * ) Notice: Subject to any disclaimer, the term of this patent is extended or adjusted under 35 U.S.C. 154(b) by 659 days.

(21) Appl. No.: 12/383,386

(22) Filed: Mar. 24, 2009

(65) Prior Publication Data
US 2009/0251613 A1 Oct. 8, 2009

(30) Foreign Application Priority Data
Apr. 2, 2008 (FR) .................................. 08 52169

(51) Int. Cl.
*H04N 5/14* (2006.01)
(52) U.S. Cl.
USPC .................. 375/240.16; 382/168; 348/700
(58) Field of Classification Search
None
See application file for complete search history.

(56) References Cited

U.S. PATENT DOCUMENTS

| | | | |
|---|---|---|---|
| 6,084,641 A * | 7/2000 | Wu | 348/722 |
| 6,396,956 B1 * | 5/2002 | Ribas-Corbera et al. | 382/239 |
| 6,597,738 B1 * | 7/2003 | Park et al. | 375/240.16 |
| 2002/0135697 A1 | 9/2002 | Wredenhagen | |
| 2004/0204919 A1 | 10/2004 | Li | |
| 2004/0252230 A1 * | 12/2004 | Winder | 348/402.1 |
| 2005/0128355 A1 | 6/2005 | Kang | |
| 2006/0139497 A1 * | 6/2006 | Caviedes | 348/700 |
| 2007/0074266 A1 * | 3/2007 | Raveendran et al. | 725/135 |
| 2009/0010546 A1 * | 1/2009 | Rossato et al. | 382/199 |

FOREIGN PATENT DOCUMENTS
EP 0951182 10/1999

OTHER PUBLICATIONS

Dantcheva A: "Video Quality Evolution" THESIS, [Online] avril 2007 (Apr. 2007), pp. 1-70, XP002501289 tu Wien, Fakultat fur Elektrotechnik und Informationstechnik Extrait de l'Internet: URL:http//publik.tuwien.ac.at/files/pub-et_12222.pdf> [extrait le Oct. 20, 2008] * p. 23-p. 56*.

Chung-Chi Lin et al: "Motion Adaptive De-interlacing with Local Scene Changes Detection" Innovative Computing, Information and Control, 2007. ICICIC '07. Second International Conference on, IEEE, PI, Sep. 1, 2007, pp. 142-142, XP031200198 ISBN: 978-0-7695-2882-3 *le document en entier*.

Search Report Dated Oct. 27, 2008.

* cited by examiner

*Primary Examiner* — Christopher S Kelley
*Assistant Examiner* — Mohammed Jebari
(74) *Attorney, Agent, or Firm* — Myers Wolin, LLC

(57) ABSTRACT

The method comprises the following steps:
  detection of the static areas in the current picture,
  calculation of a histogram for the non-static areas of the current picture
  calculation of the difference between the histogram of a current picture and the histogram of at least one preceding picture,
  declaration of scene change if the difference is greater than a predetermined threshold.

The applications related to video processing using picture movement such as up-conversion of video pace, reduction of motion compensated noise.

12 Claims, 3 Drawing Sheets

Picture T

Picture T-1

METHOD FOR DETECTING SCENE CHANGE IN A VIDEO PICTURE SEQUENCE

This application claims the benefit, under 35 U.S.C. §119, of European Patent Application No. 0852169 of 4 Apr. 2008.

FIELD OF THE INVENTION

The present invention relates to a method for detection of a change in video content in a video sequence. It relates to the domain of picture or video processing using temporal correlation and targets more specifically the detection of scene changes.

DESCRIPTION OF THE PRIOR ART

The prior art knows methods for detection of "cuts" that use all of the pixels of pictures in a video sequence.

The detection of cuts is made in general from an analysis of a luminance signal. A simple implementation solution consists in comparing two successive histograms of the video sequence and in declaring a "cut" when these two histograms are not sufficiently correlated. This "cut" information is used in video processing methods using temporal recurrence, such as resetting of video encoder parameters, updating of video processing parameters, cancellation of processing to be applied to the video, etc.

When only one part of the video picture varies suddenly, for example when text or a logo appears, or a picture in the picture or PiP (Picture in Picture), or of a local flash, etc. it can be difficult to detect such a change, specifically when the number of modified pixels is low with respect to the total number of pixels of the picture, the correlation between the successive pictures thus remaining high. In fact, a cut is detected if the content of 2 successive pictures is very different, the detection being based on picture comparison criteria. Consider the specific case of the appearance of a logo on a video. If the logo is small or differs little from the video, it is possible that globally the cut is not detected. This is not very important in the majority of processing that can be applied to the video. However, if the video processing requires use of temporal correlation, a degradation of the picture can be produced particularly, in our example, in the placement of the logo.

A solution consists in cutting the picture into areas, for example rectangles, and detecting the variations in each area. This enables refining the result that remains however very random due to the fact that the cutting is arbitrary.

SUMMARY OF THE INVENTION

One of the purposes of the invention is to overcome the aforementioned disadvantages. To this end, the purpose of the invention is a method for the detection of changes of scene in a video picture sequence, characterized in that it comprises the following steps:
  detection of static areas in the current picture,
  calculation of a histogram for the non-static areas of the current picture,
  calculation of the difference between the histogram of the current picture and the histogram of at least one preceding picture,
  declaration of scene changes if the difference is greater than a predetermined threshold.

According to a particular implementation, the threshold is adaptive and predetermined, for a picture, according to a percentage of static pixels constituting static areas of the picture.

According to a particular implementation, the detection of static areas comprises the following steps:
  cutting of the pictures into blocks of pixels,
  calculation of the SADbloc sum of absolute values of pixel differences corresponding to a block of current pixels of a current picture with a co-localised block of a preceding picture,
  comparison of the SADbloc sum at a predetermined threshold and attribution of the static label to pixels of the block if it is less than the predetermined threshold.

According to a particular implementation, the histogram differences step comprises the following steps:
  cutting up of the luminance variation area into luminance ranges,
  calculation of a histogram of occurrences of the current picture according to the luminance ranges,
  calculation of the SADhisto sum, over the set of ranges, the absolute values of the differences of occurrences of a range of the current picture and of the corresponding range of a preceding picture.

According to a particular implementation, the histogram differences step comprises the following steps:
  cutting up of the luminance variation area into luminance ranges,
  calculation of a histogram of occurrences of the current picture according to the luminance ranges,
  calculation of the difference, for each of the luminance ranges of the current picture, of occurrences with the corresponding range of a preceding picture, the preceding range and the next range, at selection of the difference corresponding to the minimum value,
  calculation of the SADhisto sum, on the set of ranges of values of differences selected.

The invention proposes to detect rapid changes of video content and do this as independently as possible of the size and form of the area that has changed.

To do this, the areas known as static areas that is areas having the same video levels or neighbouring levels on a series of consecutive pictures, heavily corrected areas, are eliminated for the comparison test. The histograms compared to detect a scene cut are thus "concentrated" on the non-static areas of the picture.

The detection threshold for scene changes can also be indexed on the number of pixels remaining after elimination of the static areas. Detection precision is thus improved. No preliminary picture cutting is needed.

Thanks to the invention, cuts in the video sequence can be defined as surely over 25% of the picture (the other 75 percent being static), as if this same picture had been zoomed over the entire picture.

BRIEF DESCRIPTION OF THE DRAWINGS

Other characteristics and advantages of the invention will emerge in the following description provided as a non-restrictive example, and referring to the annexed drawings wherein.

DETAILED DESCRIPTION OF THE EMBODIMENTS OF THE INVENTION

Figure 1:
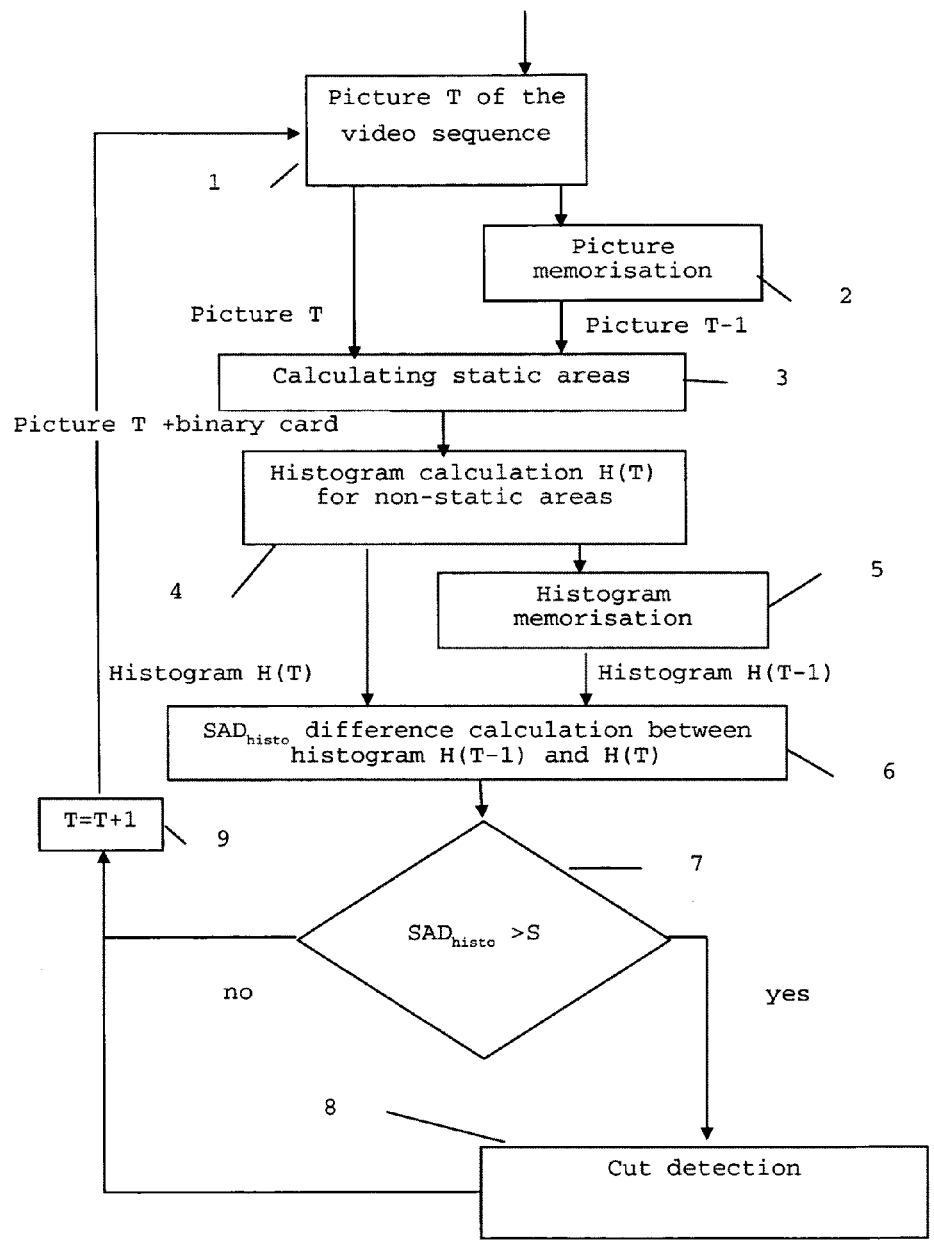
FIG. 1, an organization chart showing the various detection method steps,
  FIG. 2, picture blocks used to calculate static areas,
  FIG. 3, morphological operations on the picture,
  FIG. 4, luminance histograms.

FIG. 1 shows the various steps in the detection method for scene changes.

A current picture at instant T of the video picture sequence is received in step 1. This T picture is transmitted in step 2, for memorization, and in step 3 to calculate the static areas of the picture. Step 3 also receives the previously memorized picture T−1 from step 2. It calculates the static areas in picture T, areas defined by a picture or binary card. The current picture T is transmitted with its binary card during the following step, 4, in order to calculate a histogram H(T) of the luminance values of the static areas of the current picture T only. This histogram is memorized in step 5 and transmitted at the same time in step 6. Step 6 thus simultaneously receives the histogram H(T) of picture T and the histogram H(T−1) of the preceding picture T−1, memorized in step 5. The histogram difference is calculated during this step to provide a $SAD_{histo}$ difference value. This value is transmitted in a comparison step 7. If the $SAD_{histo}$ difference value is greater than a previously defined threshold S, the following step will be step 8 which declares that a cut has been detected. Otherwise, the following step is step 9 which increments value T to transmit it in step 1 which will then search for picture T+1 which becomes the current picture for a new iteration of the current picture. Step 8 circles back on step 1 to process a new sequence picture using the T incrementation step 9.

Step 3's static area detection is used to class every pixel of each picture as "static" or "non-static". This label is given following a calculation of the difference between the current picture and the preceding picture and this is done for every pixel or group of pixels.

Figure 2:
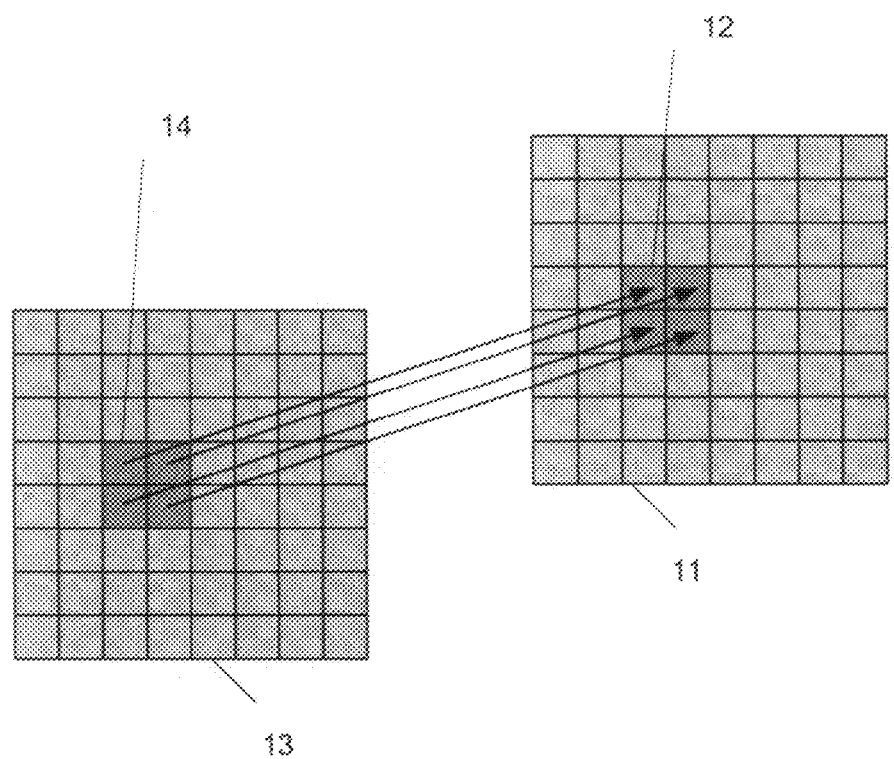

FIG. 2 illustrates an example of static area detection. The principle is based on the calculation of a picture difference per block. A current block of 2×2 pixels, reference 12, of a current picture at instant T, reference 11, is compared to its corresponding co-localised block, reference 14, in the preceding picture at instant T−1, reference 13. The luminance difference is calculated for the current block, for example a sum, for the 4 pixels, for the absolute values of differences. Thus for a pixel k and for a luminance $L_{k,T}$ of this pixel from picture T, the $SAD_{bloc}$ expression is calculated, which represents the luminance difference for a block:

$$SAD_{bloc} = \sum_{k=0}^{3} \left| \frac{L_{k,T} - L_{k,T-1}}{FdPixel} \right|$$

If the difference is lower or equal to a previously determined threshold, the block is said to be static. Otherwise, it is said to be non-static. The threshold may depend on an estimation of video noise. It may also be predefined, for example at 25.

This calculation is made for all the current picture blocks, providing a block binary card for static and non-static pixels. Classic morphological operations are then implemented to remove noise or filter the binary card, for example removing isolated static or non-static blocks, eroding the edges of static or non-static areas etc. in order to improve area segmentation.

Figure 3:
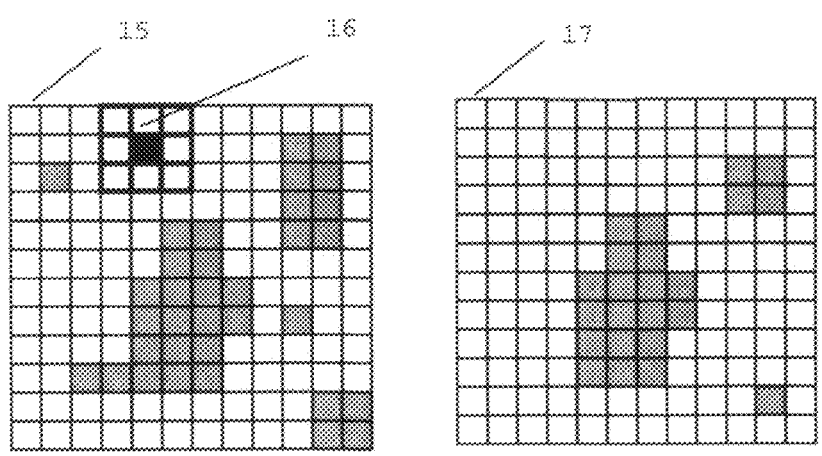

FIG. 3 represents a binary card 15 of a video picture obtained following the calculation of static areas detected and before morphological operations. Static blocks, for example defined by the unit value, are highlighted in grey in the figure. A sliding processing window 16, with 3×3 pixel dimensions, is used for filtering operations.

Thus, erosion is realized using this 3×3 centred block window on a current block of the binary card. If the number of static blocks in the window is lower than a threshold, 4 for example, the current block is forced to zero, i.e. declared non-static. The window is moved in the picture, by incrementing a block, over a whole line of blocks, then over the following line of blocks once a block has been moved vertically.

Dilatation is then realized, also using a 3×3 centred block window on a current block. If the number of non-static blocks in the window is lower than a threshold, 4 for example, the current block is then forced to one, i.e. declared static. The window is moved over the whole picture as before.

The second picture, reference 17, represents an example of the binary card following these erosion and dilatation operations.

Temporal recurrence of these "static" and "non-static" labels is then analysed in order to make the analysis more robust, still in step 3 of static area calculation. Thus, time filtering is implemented. For example, a block is validated as being static if it is declared static for at least three successive pictures. To do this, binary cards of the preceding pictures used must of course be memorized.

The picture obtained at the end of step 3 is a binary picture of static/non-static pixels or blocks, the 4 pixels of a static block being declared static.

The second processing phase relates to histograms of the pictures related to the non-static pixels or blocks of the picture only.

Figure 4:
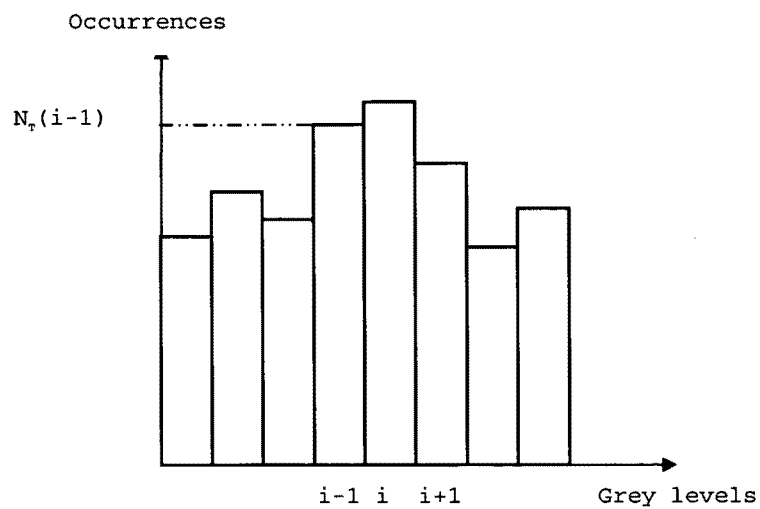
Figure 4:
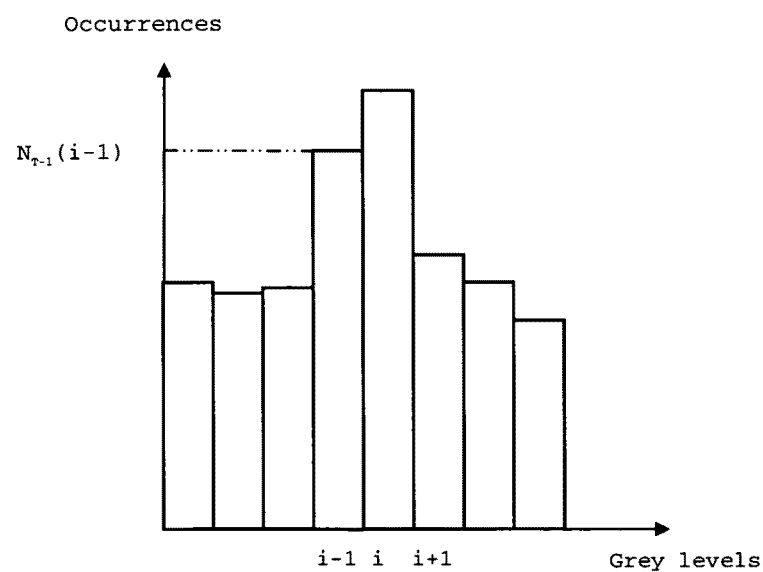

FIG. 4 represents a histogram of picture T and a histogram of picture T−1.

All the grey levels, encoded on 8 bits for example, are cut into ranges of the same width; here, 8 ranges with 32 luminance levels per range. The number of non-static pixels for image T which has a luminance value within the abscicissa range i, $N_T(i)$, is expressed in ordinates. A histogram is obtained by giving the $N_T(i)$ occurrences for each of the i luminance ranges. This histogram is compared with that memorized for picture T−1, defined by the $N_{T-1}(i)$ occurrences for each of the n i ranges.

The sum of the absolute $SAD_{histo}$ value differences gives a histogram difference criterion:

$$SAD_{histo} = \sum_{i=1}^{n} |N_T(i) - N_{T-1}(i)|$$

$N_T(i)$ is the number of occurrences related to the non-static pixels, for a luminance range i of image T, n is the number of ranges over which the luminance is spread.

This value, calculated in step 6, is compared to a threshold S in step 7. If it is greater than this threshold, the following step will be step 8 which declares a cut in the sequence. Otherwise, the following step will be step 9 which increments T in order to process the following picture in step 1.

According to one variant, the number of occurrences of a picture T, related to a range i, is compared to the number of occurrences a preceding picture T−1 related to the same range i, to the number related to the preceding range i−1 and to the number related to the following range, i+1. The minimum value found is that taken into account when calculating the differences of occurrences in step 6. Thus, a homogenous variation of luminance from one picture to another, resulting from scene or object lighting, may be attenuated when calculating luminance differences. This does not correspond to a scene change.

Another variant consists in indexing the threshold of cut determination over the total number of pixels declared static.

A histogram is calculated for the non-static pixels of a picture T of L lines of C pixels i.e. an L×C pixel picture. The classic detection threshold for scene change, i.e. by considering the picture in its entirety, is called S. When the number of non-static pixels of the binary picture is $P_{NS}$, the indexed threshold is S' takes the following formula for the detection of scene change:

$$S' = S \frac{P_{NS}}{L.C}$$

Of course, it is best to set a minimum number of non-static pixels below which the cut detection is not valid, while the maximum number, all the pixels in the picture, corresponds to a classic cut detection. For example, if this minimum number is a value S", while the $P_{NS}$ value is less that this threshold S", no scene change will be declared, whatever the value of the histograms. S" is around $\frac{1}{10,000}^{th}$ of the L×C value for example.

The type of video processing of the picture sequence that can use the invention is the type that uses movement from one picture to another. This involves, for example, the deinterlacing of motion compensated pictures, upward conversion of video pace, also known as up-conversion, reducing motion compensated noise, etc. All these procedures use the motion vectors from the motion vector field and it is necessary to have a certain level of confidence in this vector field, confidence given by non detection of scene change information.

When a sudden and localised disturbance occurs, for example the appearance of a logo or text at the bottom of the picture, the decision to cut means it is possible to switch processing to a less critical foldover mode. For example, the sudden appearance of the logo results in disturbing the temporal recurrence of video processing, for the movement estimator among other aspects. In this case, this leads to false motion vectors in the logo area and may result in a major deformation of the video being processed. It is best, in this case, to switch processing to a less critical foldover mode. Instead of interpolating from the field's motion vector, for example, an average luminance is calculated for the current pixel and the co-localised pixel of the preceding image in order to realize a fade. In fact, in this case, this results in forcing the motion vector to zero. Another solution involves extrapolating from the motion vector related to the preceding picture instead of taking into account the motion vector related to the current picture.

The various steps of the method have been described for pictures with progressive scanning. For interlaced images, histograms are compared for frames of the same parity.

Furthermore, the histograms described are related to the luminance values. They can also refer to the chrominance values of the picture's pixels.

The method for detecting static areas uses a 2×2 pixel sized picture block. It is also possible to use a 3×3 pixel sized picture block and to consider the current pixel at the centre of the block. This pixel is declared static if the sum of the absolute values of the differences of the 8 pixels around the current pixel, or even the 9 pixels of the block, is less than a threshold.

The invention claimed is:

1. Method for detecting scene change in a sequence of video pictures, executed by a processor, comprising:
    detecting static areas in the current picture, wherein the static areas depend on the picture content;
    calculating a histogram for non-static areas of the current picture, wherein static areas of the picture are skipped;
    calculating the difference between the histogram of a current picture and the histogram of at least one preceding picture stored in a memory,
    declaring scene change if the difference is greater than a threshold, wherein the threshold is adaptive and predetermined, for a picture, in accordance with a percentage of static pixels constituting the static areas of the picture;
    wherein the threshold is adaptive according to $S'=S*P_{NS}/L.C$, wherein S is the threshold for the whole picture, $P_{NS}$ is the number of non-static pixels of the picture, and LC is the number of pixels in the whole picture, and wherein the cut detection is only valid above a defined minimum number of non-static pixels.

2. Method according to claim 1, wherein the detecting static areas comprises:
    cutting of the pictures into blocks of pixels,
    calculating the SADbloc sum of the absolute values of the pixel differences corresponding to a current pixel block of a current picture for a co-localised block of a preceding picture,
    comparing the SADbloc sum with the threshold and attributing a static label to the pixels of the block if it is less than the threshold.

3. Method according to claim 1, wherein the calculating the difference comprises:
    cutting up the luminance variation area into luminance ranges,
    calculating a histogram of occurrences of the current picture according to the luminance ranges,
    calculating the SADhisto sum, over the set of ranges, the absolute values of the differences of occurrences of a range of the current picture and of the corresponding range of a preceding picture.

4. Method according to claim 1, wherein the calculating the difference comprises:
    cutting up the luminance variation area into luminance ranges,
    calculating a histogram of occurrences of the current picture according to the luminance ranges,
    calculating the difference, for each of the luminance ranges of the current picture, of occurrences with the corresponding range of a preceding picture, the preceding range and the next range, at selection of the difference corresponding to the minimum value,
    calculating the SADhisto sum, on the set of ranges of values of differences selected.

5. Method according to claim 1, wherein the static areas are individual for each picture.

6. Method according to claim 1, wherein the static areas are all the areas that comprise blocks having the same or neighboring video levels on a series of consecutive pictures.

7. Method according to claim 1, wherein the detection of static areas comprises cutting the pictures into blocks of rectangular areas.

8. Method according to claim 1, wherein the detection of static areas comprises steps of cutting of the pictures into blocks of 2×2 or 3×3 pixels, and generating a binary card of each video picture, wherein the binary card indicates for each block whether it is static or non-static.

9. Method according to claim 8, further comprising performing morphological operations on the binary card, wherein isolated static or non-static blocks are removed, or edges of static or non-static areas are eroded.

10. Method according to claim 9, wherein a sliding processing window of 3×3 pixels is used for filtering operations.

11. Method according to claim 9, wherein the erosion of the edges of static or non-static areas is realized using a 3×3 centred block window on a current block of the binary card, and wherein the current block is declared non-static if the number of static blocks in the window is lower than a threshold number of blocks.

12. Method according to claim 9, wherein the removing of isolated static or non-static blocks comprises using a 3×3 centred block window on a current block, and wherein the current block is declared static if the number of non-static blocks in the window is lower than a threshold number of blocks.

* * * * *